United States Patent
Wang et al.

(10) Patent No.: US 9,892,042 B2
(45) Date of Patent: Feb. 13, 2018

(54) METHOD AND SYSTEM FOR IMPLEMENTING DIRECTORY STRUCTURE OF HOST SYSTEM

(71) Applicant: Inspur (Beijing) Electronic Information Industry Co., Ltd., Beijing (CN)

(72) Inventors: Endong Wang, Beijing (CN); Leijun Hu, Beijing (CN); Rengang Li, Beijing (CN)

(73) Assignee: Inspur (Beijing) Electronic Information Industry Co., Ltd., Beijing (CN)

( * ) Notice: Subject to any disclaimer, the term of this patent is extended or adjusted under 35 U.S.C. 154(b) by 0 days.

(21) Appl. No.: 14/894,614

(22) PCT Filed: Jan. 12, 2015

(86) PCT No.: PCT/CN2015/070530
§ 371 (c)(1),
(2) Date: Nov. 30, 2015

(87) PCT Pub. No.: WO2016/078205
PCT Pub. Date: May 26, 2016

(65) Prior Publication Data
US 2017/0147492 A1    May 25, 2017

(30) Foreign Application Priority Data
Nov. 21, 2014 (CN) .......................... 2014 1 0675356

(51) Int. Cl.
*G06F 12/08* (2016.01)
*G06F 12/0817* (2016.01)
(Continued)

(52) U.S. Cl.
CPC ...... *G06F 12/0817* (2013.01); *G06F 12/0842* (2013.01); *G06F 12/0895* (2013.01); *G06F 2212/1016* (2013.01); *G06F 2212/608* (2013.01)

(58) Field of Classification Search
CPC ............. G06F 17/30876; G06F 9/5044; G06F 17/30867; G06F 17/30893; G06F 12/0817;
(Continued)

(56) References Cited

U.S. PATENT DOCUMENTS

| | | | |
|---|---|---|---|
| 2001/0010068 A1 | 7/2001 | Michael et al. | |
| 2003/0005237 A1* | 1/2003 | Dhong | ................ G06F 12/0811 711/146 |

(Continued)

FOREIGN PATENT DOCUMENTS

| | | |
|---|---|---|
| CN | 102063407 A | 5/2011 |
| CN | 103049422 A | 4/2013 |

(Continued)

OTHER PUBLICATIONS

International Search Report of PCT/CN2015/070530, dated Aug. 12, 2015.

*Primary Examiner* — Zhuo Li
(74) *Attorney, Agent, or Firm* — Banner & Witcoff, Ltd.

(57) ABSTRACT

A method and system for implementing a directory structure of a host system are disclosed. The method includes: multiple basic computing units interconnecting via a high speed internetwork to construct a system computing unit set; wherein each basic computing unit comprises a protocol processing chip and a system resource management firmware; and dividing a part implementing a logic function in the protocol processing chip into a static part and a dynamic part in advance, wherein the dynamic part can be reconstructed; constructing a system cache directory storage
(Continued)

architecture through the dynamic part; and the system resource management firmware managing system resources by means of configuration.

8 Claims, 4 Drawing Sheets

(51) Int. Cl.
*G06F 12/0842* (2016.01)
*G06F 12/0895* (2016.01)

(58) Field of Classification Search
CPC ............. G06F 12/0842; G06F 12/0895; G06F 17/3089; G06F 2212/1016; G06F 2212/608; G06F 12/0862; G06F 12/0844; G06F 13/1642; G06F 2212/1008; G06F 2212/1024
See application file for complete search history.

(56) References Cited

U.S. PATENT DOCUMENTS

| | | | |
|---|---|---|---|
| 2009/0182893 A1* | 7/2009 | Anand | G06F 12/0831 709/238 |
| 2011/0161783 A1* | 6/2011 | Somasekhar | G06F 11/1064 714/768 |
| 2017/0004098 A1* | 1/2017 | Das Sharma | G06F 13/385 |

FOREIGN PATENT DOCUMENTS

| | | |
|---|---|---|
| CN | 103729309 A | 4/2014 |
| CN | 103955435 A | 7/2014 |

* cited by examiner

METHOD AND SYSTEM FOR IMPLEMENTING DIRECTORY STRUCTURE OF HOST SYSTEM

TECHNICAL FIELD

The present invention relates to the field of computer, and specifically, to a method and system for implementing a directory structure of a host system.

BACKGROUND OF THE RELATED ART

With the rapid development of the computer technology, in order to meet demands of social and economic development, a high-performance computer system becomes one of the bottlenecks which restrict the society to develop key fields. The key fields such as finance and telecom, etc. have extremely high requirements on the performance of the computer system, thus it is required to construct a huge multipath computer system, so as to better adapt to the current application requirements of various fields, but it also gets into a problem of availability of the multipath computer system construction and system verification one the other hand, a high-end computer system needs a protocol processing chip to achieve the maintenance of a system cache consistency protocol, and the protocol processing chip needs a huge memory to store a system cache directory, thus it poses a challenge to the design of a memory controller and the layout difficulty of a board memory, which greatly affects a board card yield rate and system verification efficiency.

SUMMARY OF THE INVENTION

In order to solve the above problem, the present invention provides a method and system for implementing a directory structure of a host system, which can achieve the diversity of system directory storage structures and greatly improve the availability of the system.

In order to achieve the above object, the following technical scheme is adopted.

A method for implementing a directory structure of a host system comprises:

multiple basic computing units interconnecting via a high speed internetwork to construct a system computing unit set; wherein each basic computing unit comprises a protocol processing chip and a system resource management firmware;

dividing a part implementing a logic function in the protocol processing chip into a static part and a dynamic part in advance, wherein the dynamic part can be reconstructed; constructing a system cache directory storage architecture through the dynamic part; and the system resource management firmware managing system resources by means of configuration.

Alternatively, the method further comprises: maintaining a system cache consistency protocol through the static part of the protocol processing chip; and performing an inter-chip interconnection for the protocol processing chip via the high speed internetwork to construct a multipath processor system; wherein a cache directory of the protocol processing chip is stored in a system internal storage or a local double data rate synchronous dynamic random access memory (DDR) of the reconstructible protocol processing chip.

Alternatively, the method further comprises: when the cache directory is stored with the system internal storage, configuring the dynamic part into a high-capacity on-chip memory to cache the cache directory, and when the cache directory is stored with the local DDR, configuring the dynamic part into multiple memory controllers to access the cache directory stored in the local DDR.

Alternatively, the step of the system resource management firmware managing system resources by means of configuration comprises: when the cache directory is stored with the system internal storage, the system resource management firmware mapping directory storage space to a reserver and configuring the reserver in a reserved status, and when the cache directory is stored with the local DDR, the system resource management firmware performing address space mapping on all system internal storages.

A system for implementing a directory structure of a host system comprises: multiple basic computing units; wherein, the basic computing units interconnect via a high speed internetwork to construct a system computing unit set; each basic computing unit comprises: a protocol processing chip and a system resource management firmware;

wherein, a part implementing a logic function in the protocol processing chip is divided into a static part and a dynamic part in advance, and the dynamic part can be reconstructed; and the dynamic part is configured to construct a system cache directory storage architecture;

the system resource management firmware is configured to manage system resources by means of configuration.

Alternatively, the static part is configured to maintain a system cache consistency protocol; the protocol processing chip performs an inter-chip interconnection with other protocol processing chips via the high speed internetwork to construct a multipath processor system; wherein a cache directory of the protocol processing chip is stored in a system internal storage or a local double data rate synchronous dynamic random access memory (DDR) of the reconstructible protocol processing chip.

Alternatively, when the cache directory is stored with the system internal storage, the dynamic part is configured into a high-capacity on-chip memory to cache the cache directory, and when the cache directory is stored with the local DDR, the dynamic part is configured into multiple memory controllers to access the cache directory stored in the local DDR.

Alternatively, the system resource management firmware managing the system resources by means of configuration refers to: when the cache directory is stored with the system internal storage, the system resource management firmware mapping directory storage space to a reserver and configuring the reserver in a reserved status, and when the cache directory is stored with the local DDR, the system resource management firmware performing address space mapping on all system internal storages.

Compared with the related art, with the scheme of the embodiments of the present invention, the diversity of system directory storage structures can be achieved, and the availability of the system can be greatly improved. Meanwhile, the verification difficulty of the multipath system is also greatly reduced due to the changeable structure characteristics, and the utilization ratio of the PCB board card is improved.

BRIEF DESCRIPTION OF DRAWINGS

The accompanying drawings in the embodiments of the present invention will be described below, and the accompanying drawings in the embodiments are used to provide a further understanding of the present invention, and explain

PREFERRED EMBODIMENTS OF THE INVENTION

The present invention will be further described in combination with the accompanying drawings below, which cannot be used to limit the protection scope of the present invention.

A design method for the implementation of directory structure of a high-end host system according to the embodiment of the present invention mainly considers the characteristics of complicated structure design of the multipath processor system, and two paths of computing nodes are used as basic computing units, and the system cache consistency are maintained through protocol processing chips, and interconnection is performed via a high speed internetwork, to construct a large-scale tightly coupled multiprocessor system. The protocol processing chips maintain the system cache consistency protocol, thus it is required to equip a large-capacity memory to store a cache directory of the system, and when the large-capacity memory is equipped, a chip is required to integrate multiple memory controllers, so that the design difficulty and area of chip increases, and meanwhile, the board-level integration of the large-capacity memory poses a great challenge to both PCB design and a yield rate of the board card, and brings risks to the verification debugging of the system.

The key technology of the flexible and changeable cache directory structure design of the high-end host system is how to implement a changeable cache directory structure implementation mode, and how to implement the integration of system resources under different structures. Therefore, the diversity of system directory storage structures is achieved with the design technology of the reconstructible protocol processing chip and the configurable system resource management firmware, which can greatly improve the availability of the system and reduce the design risks.

Figure 1:
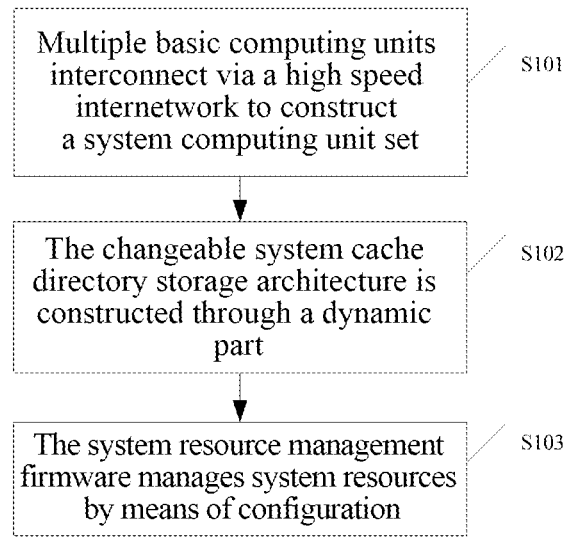
FIG. 1 is a flow chart of a method for implementing a directory structure of a host system according to the embodiment of the present invention.

The embodiment of the present invention provides a method for implementing a directory structure of a host system, and as shown in FIG. 1, the method includes the following steps.

In step S101, multiple basic computing units interconnect via a high speed internetwork to construct a system computing unit set; each basic computing unit includes a protocol processing chip and a system resource management firmware.

Wherein, the protocol processing chip is reconstructible; the system resource management firmware is configurable; and the basic computing units can be two paths of computing nodes.

Figure 3:
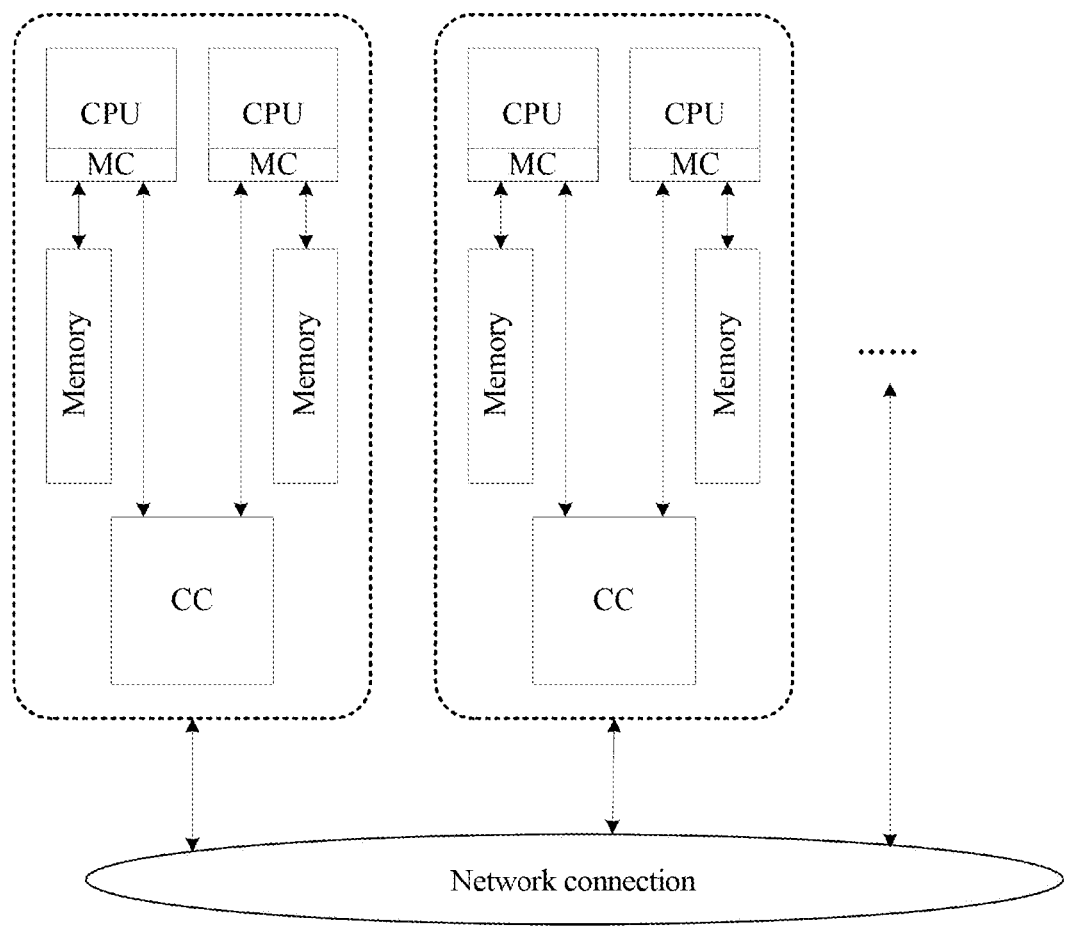
FIG. 3 is a structure chart of the main memory of host system implementing the directory storage according to the embodiment of the present invention.
Figure 4:
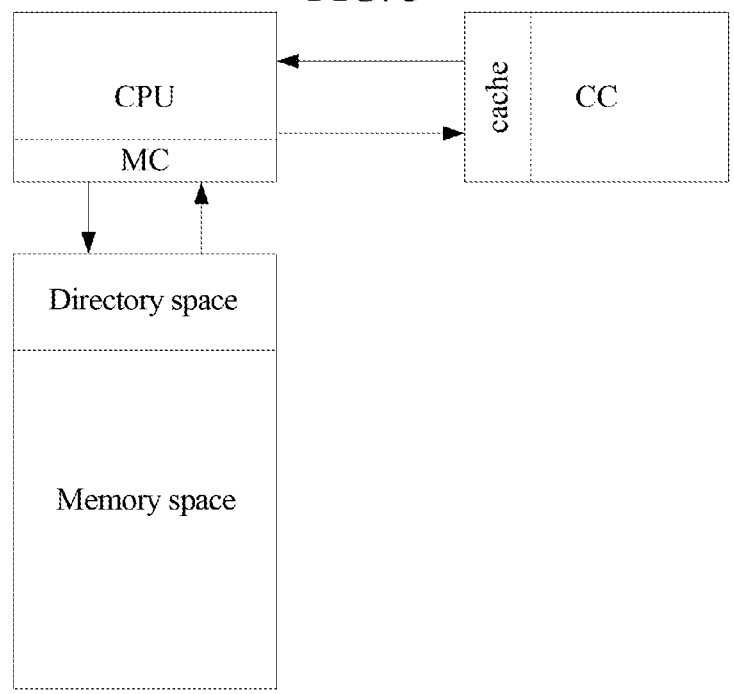
FIG. 4 is a structure chart of a single basic computing unit when the main memory of host system implements the directory storage according to the embodiment of the present invention.
Figure 6:
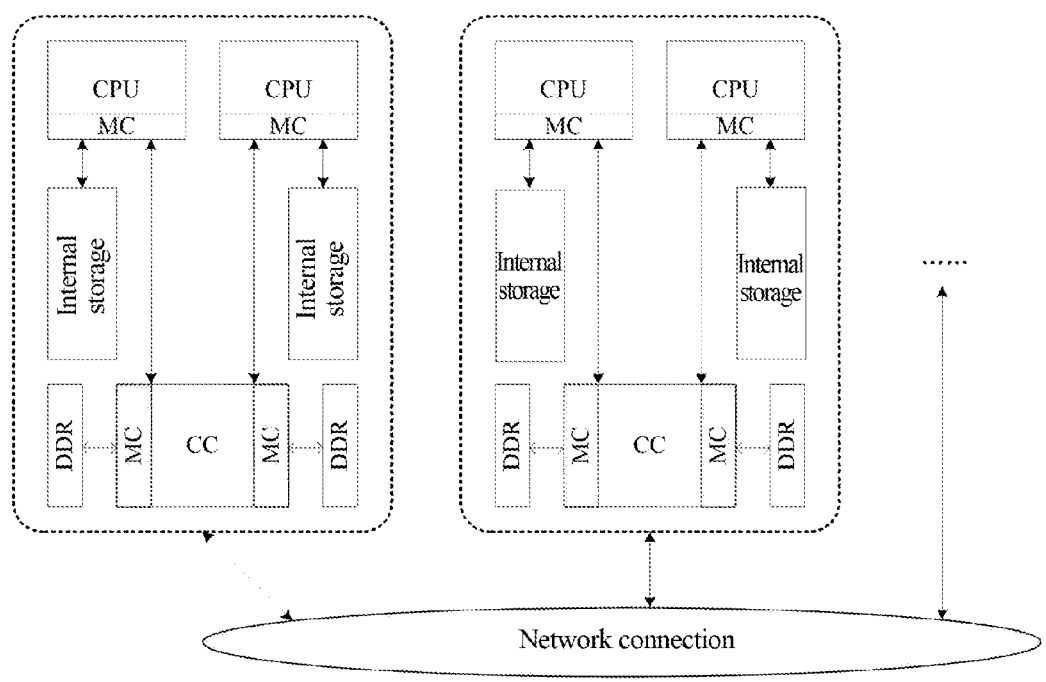
FIG. 6 is a structure chart of the local DDR of host system implementing the directory storage according to the embodiment of the present invention.
Figure 7:
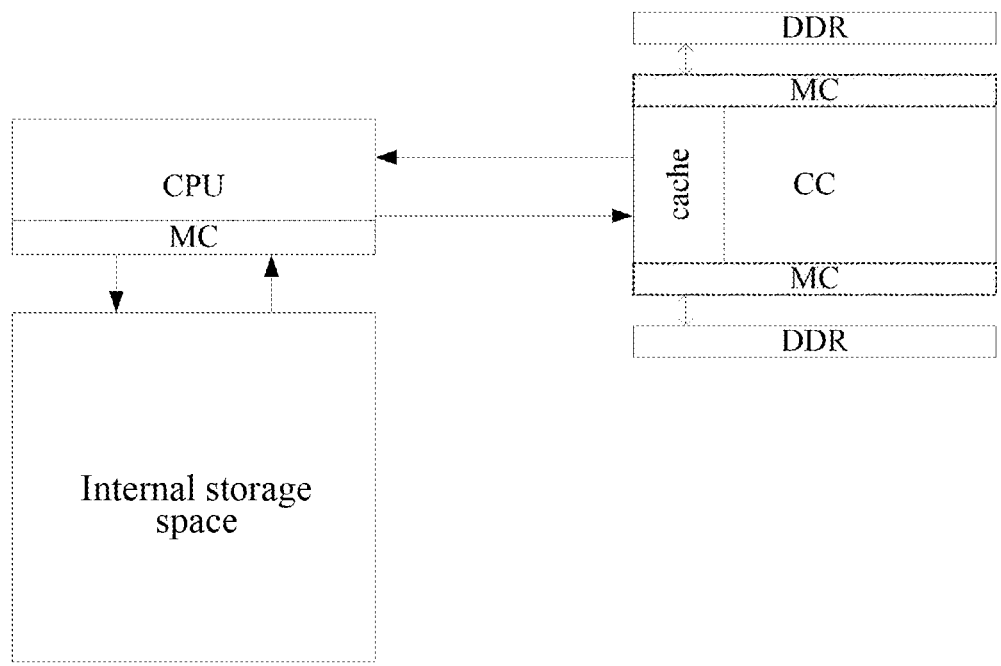
FIG. 7 is a structure chart of a single basic computing unit when the local DDR of host system implements the directory storage according to the embodiment of the present invention.

Alternatively, the method also includes: maintaining a system cache consistency protocol through the reconstructible protocol processing chip; and an inter-chip interconnection is performed on the reconstructible protocol processing chip via the high speed internetwork, to construct a multipath processor system; wherein a cache directory of the reconstructible protocol processing chip can be stored in a system internal storage, as shown in FIG. 3 and FIG. 4, MCs (master chips) in two paths of CPUs in one basic computing unit are connected with one memory respectively and connected with the same CC (collaborative chipset), and multiple basic computing units are connected via the network; wherein the CC includes a cache, and the memory includes directory space and memory space; or the cache directory can be stored in a local double data rate synchronous dynamic random access memory (DDR) of the reconstructible protocol processing chip, as shown in FIG. 6 and FIG. 7, MCs (master chips) in two paths of CPUs in one basic computing unit are connected with one memory respectively and connected with the same CC (collaborative chipset), and multiple basic computing units are connected via the network; wherein the CC includes two MCs, and each MC is connected with one DDR; the CC includes a cache, and the internal storage includes internal storage space.

In step S102, a part implementing a logic function in the protocol processing chip is divided into a static part and a dynamic part in advance; the dynamic part can be reconstructed; and a changeable system cache directory storage architecture is constructed through the dynamic part.

The part implementing the logic function includes logic devices that can perform logical processing and operation (including hardware and devices loaded with logical processing and operation software) and circuits that connect these logic devices.

The static part includes the basic function logic of the protocol processing chip, and it is not reconstructed; the basic function logic refers to a basic function required to be implemented no matter which logic the chip is reconstructed into; the function implemented by each chip is different, and basic functions of different chips are also different.

The maintenance of the system cache consistency protocol is implemented through the static part; when the cache directory is stored with the system internal storage, the protocol processing chip configures the dynamic part into a high-capacity on-chip memory to cache the cache directory, and when the cache directory is stored with the local DDR, the protocol processing chip configures the dynamic part into multiple memory controllers to access the cache directory stored in the local DDR.

In step S103, the system resource management firmware manages the system resources by means of configuration.

Figure 5:
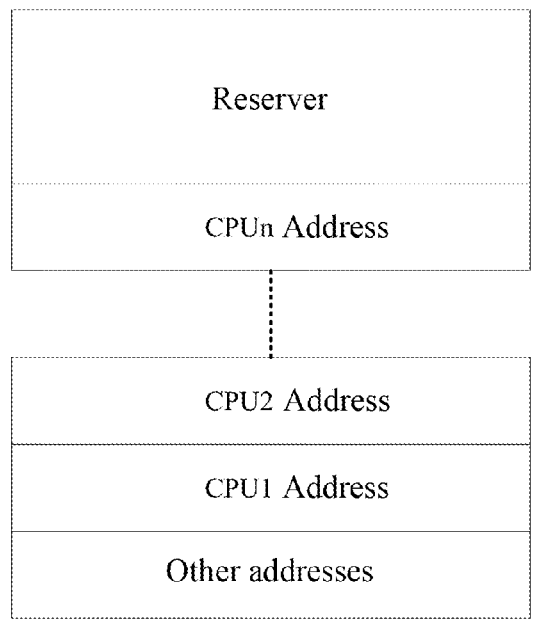
FIG. 5 is the reserver of host system reserving the directory space according to the embodiment of the present invention.
Figure 8:
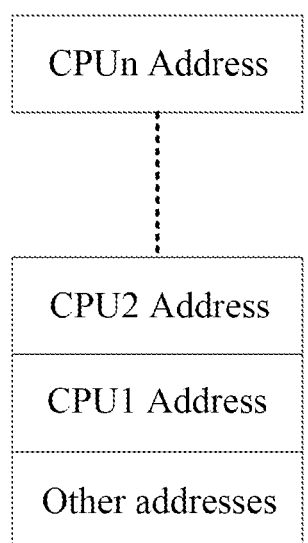
FIG. 8 is an address mapping diagram of the local DDR of host system implementing the directory storage according to the embodiment of the present invention.

Alternatively, the system resource management firmware managing the system resources by means of configuration refers to: when the cache directory is stored with the system internal storage, the system resource management firmware mapping directory storage space to a reserver and configuring the reserver in a reserved status, as shown in FIG. 5, and making the part of storage space unavailable to the upper layer software, and when the cache directory is stored with the local DDR, the system resource management firmware performing address space mapping on all system internal storages, as shown in FIG. 8.

Figure 2:
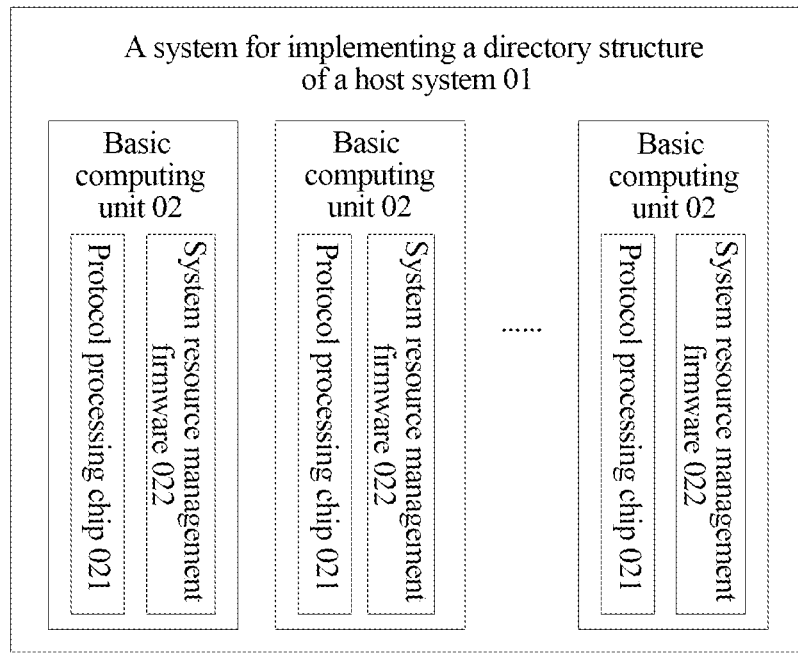
FIG. 2 is a block diagram of a system for implementing a directory structure of a host system according to the embodiment of the present invention.

The embodiment of the present invention also provides a system 01 for implementing a directory structure of a host system, and as shown in FIG. 2, the system includes: a basic computing units 02.

The basic computing units 02 interconnect via a high speed internetwork to construct a system computing unit set; each basic computing unit 02 includes: a protocol processing chip 021 and a system resource management firmware 022;

wherein, a part implementing a logic function in the protocol processing chip is divided into a static part and a dynamic part in advance, and the dynamic part can be reconstructed; and the dynamic part is configured to construct a system cache directory storage architecture;

the system resource management firmware is configured to manage system resources by means of configuration.

Alternatively, the static part is configured to maintain a system cache consistency protocol; the protocol processing chip 021 performs an inter-chip interconnection with other protocol processing chips via the high speed internetwork to construct a multipath processor system; wherein a cache directory of the protocol processing chip 021 is stored in a system internal storage or a local double data rate synchronous dynamic random access memory (DDR) of the reconstructible protocol processing chip.

Alternatively, when the cache directory is stored with the system internal storage, the dynamic part is configured into a high-capacity on-chip memory to cache the cache directory, and when the cache directory is stored with the local DDR, the dynamic part is configured into multiple memory controllers to access the cache directory stored in the local DDR.

Alternatively, the system resource management firmware 022 is also used to: when the cache directory is stored with the system internal storage, map directory storage space to a reserver and configure the reserver in a reserved status, and make the part of storage space unavailable to the upper layer software, and when the cache directory is stored with the local DDR, perform address space mapping on all system internal storages.

In such design of the directory storage structure of the computer system, a design method that the chip can be reconstructed is adopted, which implements the changeability of the directory storage structure and mode of the multipath processor system, constructs a highly reliable host system architecture, efficiently implements the global memory sharing, greatly reduces a system design risk and debug verification difficulty, improves the availability of the complicated PCB board card, and possess a very high technological value.

It should be noted that the above embodiments are only for the skilled in the art to have an easier understanding, which is not used to limit the protection scope of the present invention, and in the premise of not departing from the inventive concept of the present invention, all apparent substitutions and improvements of the present invention made by the skilled in the art are within the protection scope of the present invention.

INDUSTRIAL APPLICABILITY

Through the scheme of the embodiments of the present invention, the diversity of system directory storage structures can be achieved, and the availability of the system can be greatly improved. Meanwhile, the verification difficulty of the multipath system is also greatly reduced due to the changeable structure characteristics, and a utilization ratio of the PCB board card is improved. Therefore, the present invention has a very strong industrial applicability.

What is claimed is:

1. A method for implementing a directory structure of a host system, comprising:
    a plurality of basic computing units interconnecting to construct a system computing unit set; wherein each of the basic computing units comprises a protocol processing chip and a system resource management firmware;
    dividing a part implementing a logic function in the protocol processing chip into a static part and a dynamic part in advance, wherein the dynamic part can be reconstructed; constructing a system cache directory storage architecture through the dynamic part; the method further comprising: when a cache directory is stored with a system internal storage, configuring the dynamic part into a high-capacity on-chip memory to cache the cache directory, and when the cache directory is stored with a local double data rate synchronous random access memory (DDR), configuring the dynamic part into a plurality of memory controllers to access the cache directory stored in the local DDR.

2. The method for implementing the directory structure of the host system according to claim 1, further comprising: maintaining a system cache consistency protocol through the static part of the protocol processing chip.

3. The method for implementing the directory structure of the host system according to claim 2, wherein, the step of the system resource management firmware managing system resources by means of configuration comprises: when a cache directory is stored with a system internal storage, the system resource management firmware mapping directory storage space to a reserver and configuring the reserver in a reserved status, and when the cache directory is stored with the local DDR, the system resource management firmware performing address space mapping on all system internal storages.

4. The method for implementing the directory structure of the host system according to claim 1, wherein, the step of the system resource management firmware managing system resources by means of configuration comprises: when a cache directory is stored with a system internal storage, the system resource management firmware mapping directory storage space to a reserver and configuring the reserver in a reserved status, and when the cache directory is stored with the local DDR, the system resource management firmware performing address space mapping on all system internal storages.

5. A system for implementing a directory structure of a host system, comprising: a plurality of basic computing units; wherein,
    the basic computing units interconnect to construct a system computing unit set; each of the basic computing units comprises: a protocol processing chip and a system resource management firmware;
    wherein, a part implementing a logic function in the protocol processing chip is divided into a static part and a dynamic part in advance, and the dynamic part can be reconstructed; and the dynamic part is configured to construct a system cache directory storage architecture; wherein: when a cache directory is stored with a system internal storage, the dynamic part is configured into a high-capacity on-chip memory to cache the cache directory, and when the cache directory is stored with a local double data rate synchronous random access memory (DDR), the dynamic part is configured into a plurality of memory controllers to access the cache directory stored in the local DDR.

6. The system for implementing the directory structure of the host system according to claim 5, wherein, the static part is configured to maintain a system cache consistency protocol.

7. The system for implementing the directory structure of the host system according to claim 6, wherein, the system resource management firmware managing the system resources by means of configuration refers to: when a cache directory is stored with a system internal storage, the system resource management firmware mapping directory storage space to a reserver and configuring the reserver in a reserved status, and when the cache directory is stored with the local DDR, the system resource management firmware performing address space mapping on all system internal storages.

8. The system for implementing the directory structure of the host system according to claim 5, wherein, the system resource management firmware managing the system resources by means of configuration refers to: when a cache directory is stored with a system internal storage, the system resource management firmware mapping directory storage space to a reserver and configuring the reserver in a reserved status, and when the cache directory is stored with the local DDR, the system resource management firmware performing address space mapping on all system internal storages.

* * * * *